United States Patent [19]

Richter et al.

[11] Patent Number: 4,835,909

[45] Date of Patent: Jun. 6, 1989

[54] SURFACE TREATMENT OF DISK-SHAPED NICKEL-PLATED ALUMINUM SUBSTRATES

[75] Inventors: Juergen Richter, Ludwigshafen; Werner Grau, Bobenheim-Roxheim; Gerd Maurer, Kaiserslautern; Friedrich Domas, Altlussheim; Werner Loeser, Ludwigshafen; Rainer Bender, Oberkirch; Axel-Ruediger Schulze, Offenburg; Kurt Doerr, Mannheim, all of Fed. Rep. of Germany

[73] Assignee: BASF Aktiengesellschaft, Ludwigshafen, Fed. Rep. of Germany

[21] Appl. No.: 82,226

[22] Filed: Aug. 6, 1987

[51] Int. Cl.⁴ .............................................. B24B 1/00
[52] U.S. Cl. ................................ 51/281 SF; 51/326; 156/664
[58] Field of Search ..................... 51/111 R, 117, 118, 51/281 R, 281 SF, 326, 327, 318; 156/664; 29/527.2, 527.4; 427/129, 292

[56] References Cited

U.S. PATENT DOCUMENTS

| | | |
|---|---|---|
| 4,224,381 | 9/1980 | Patel et al. . |
| 4,347,689 | 9/1982 | Hammond ...................... 51/281 SF |
| 4,528,063 | 7/1985 | Lawrence et al. .............. 156/664 X |
| 4,586,296 | 5/1986 | Saunders .......................... 51/281 SF |
| 4,659,605 | 4/1987 | Malik et al. .......................... 427/129 |
| 4,659,606 | 4/1987 | Wada et al. .......................... 427/129 |
| 4,673,590 | 6/1987 | Hashimoto et al. ................. 427/129 |
| 4,698,251 | 10/1987 | Fakuda et al. .................. 427/129 X |

FOREIGN PATENT DOCUMENTS 3601848  7/1986  Fed. Rep. of Germany .

OTHER PUBLICATIONS

"UCAR DP-1 Computer Disk Polish", Union Carbide Specialty Powders, 1985, DP-1T5C6-1-85.
"Japanese Industrial Standard Surface Roughness", Japanese Standards Association, JIS B 0601, 1976.
Deutsche Normen, DIN 4768, Aug. 1974.

Primary Examiner—Robert P. Olszewski
Attorney, Agent, or Firm—Keil & Weinkauf

[57] ABSTRACT

Disk-shaped nickel-plated aluminum substrates which are used as bases in the production of magnetic recording disks having a magnetizable metallic layer are surface treated by polishing and texturing.

1 Claim, No Drawings

SURFACE TREATMENT OF DISK-SHAPED NICKEL-PLATED ALUMINUM SUBSTRATES

The present invention relates to a process for the surface treatment of disk-shaped nickel-plated aluminum substrates which are used as bases in the production of magnetic recording disks having a magnetizable metallic layer.

BACKGROUND OF THE INVENTION

Magnetic recording disks comprising a rigid base which usually consists of an aluminum alloy are chiefly used for data storage. Magnetic storage disks whose recording layer essentially consists of a magnetic material finely dispersed in a binder matrix have long been known and are predominantly used. The steady increase in the storage density of magnetic disks necessitates a corresponding reduction in the thickness of the recording layer and a simultaneous increase in the coercive force. It is becoming increasingly impossible to meet these requirements with dispersion layers. Since it is technically very difficult to compact homogeneous dispersion layers having a uniform thickness of less than 0.5 $\mu$m, there is a need for novel coating technologies and novel magnetic materials which make it possible to produce very thin magnetic layers having a homogeneous microstructure and a very smooth surface. Chemical and electrochemical deposition as well as a vapor deposition and sputtering of suitable metals or alloys are possible methods for this purpose. The magnetic properties of thin layers are generally determined by the composition, microstructure and layer thickness. Surface roughness and internal stresses in the film are also important.

Chemically deposited coherent Co-P magnetic layers are now used in commercial thin-film magnetic disks. These layers make it possible to obtain a very high coercive force of from 40 to 80 kA/m and a high relative remanence of more than 0.8 in the plane of the layer at a layer thickness of less than 100 nm. They consist of hexagonally arranged (Co-P) crystallites in an amorphous (Co-P) matrix.

To produce these thin-film magnetic disks, the aluminum substrates are coated in a first step, by a chemical method, with a hard nonmagnetic amorphous (Ni-P) lower layer which is about 20 $\mu$m thick and has a P content of from 15 to 20 atom %, making it possible to eliminate small substrate defects. The great hardness of the lower layer improves the tribological properties of the magnetic disk in relation to the head and, in a subsequent surface treatment step, makes it possible to obtain a defined surface roughness which is necessary for reproducible flight behavior of the head. Furthermore, the (Ni-P) surface has a sufficiently high catalytic activity for the subsequent coating with (Co-P) by immersion in a metastable, chemical bath, so that additional surface nucleation with foreign elements which promote deposition, for example Pd, can be dispensed with. Moreover, the amorphous Ni-P structure which is free of particle boundaries favors a homogeneous microstructure of the growing thin (Co-P) layer.

Thus, the surface quality of the nickel-plated aluminum substrates has a substantial effect on the usefulness of the magnetic layers. The surface has to meet high requirements in respect of cleanness and a uniform and defined roughness profile, in order to ensure satisfactory chemical deposition of the magnetic metal layer on the substrate and the required mechanical properties of the corresponding disks possessing metal layers. At present, surface treatmnet is carried out by a method in which, in a first operation, the nickel-plated aluminum substrates are polished in order to eliminate local irregularities, such as peaks and holes. The substrates are then cleaned and dried in order to remove the residues of polishing agent which interfere with the subsequent texturing process. In order to achieve a defined roughness, the clean substrates are then textured in a known manner in one direction which essentially corresponds to the recording direction for information storage, ie. circularly (DE-A 36 01 848). The substrates then have to be cleaned and dried again before the isolated peaks formed during texturing are finally removed manually using a fine abrasive paper. After a final cleaning step, the nickel-plated substrates can be provided with the magnetic layer.

It is an object of the present invention to improve the surface treatment of disk-shaped nickel-plated aluminum substrates suitable for the production of thin-film magnetic disks so that both the number of treatment steps required is reduced and the result of the treatment is improved and hence the yield of thin-film magnetic disks increased.

BRIEF SUMMARY OF THE INVENTION

We have found that this object is achieved, and that the surface treatment of disk-shaped nickel-plated aluminum substrates which are suitable as bases for the production of metallic film disks having a magnetizable cobalt-phosphorus layer can be improved by polishing and texturing the nickel layer to a peak-to-valley height $R_t$ of from 0.04 to 0.1 $\mu$m, an average peak-to-valley height $R_z$ of from 0.04 to 0.1 $\mu$m and a center line average value $R_a$ of from 0.0065 to 0.0095 $\mu$m, if the nickel-plated aluminum disk is first polished with a polishing agent, in an automatic machine which laps on both sides, with removal of from 2.0 to 4.0 $\mu$m of the surface per side, to a center line average value $R_a$ of from 0.004 to 0.006 $\mu$m, and directly thereafter is textured in the same automatic machine with the use of a polishing agent which has from 3 to 10 times the particle size of that initially used, with the formation of arcuate radial sections.

DETAILED DESCRIPTION OF THE INVENTION

For the purposes of the present invention, texturing means the production of scratches which are close together, have a defined direction and a defined density and depth in the surface of polished disk-shaped, nickel-plated aluminum substrates. The depth and density of the scratched system are defined by the peak-to-valley height $R_t$ (according to DIN 4,768), the average peak-to-valley height $R_z$ (according to DIN 4,768) and the center line average value $R_a$ (according to DIN 4,768).

To carry out the novel process, the disk-shaped aluminum substrates nickel-plated according to the prior art (for example according to U.S. Pat. No. 4,224,381) are polished using a double-sided automatic lapping machine in order to eliminate local irregularities on the substrate surface.

The substrates are present between two polishing rings rotating in the same direction and provided with a polishing cloth, and are coated with polishing agent. A very smooth surface having a center line average value $R_a$ of from 0.004 to 0.006 $\mu$m is obtained using a soft polishing cloth and a polishing agent which removes material mechanically and chemically. The polishing agent is commercially available and essentially consists of alumina, silicon carbide or diamond and has a mean particle size of from 0.2 to 0.5 $\mu$m. The polishing process removes from 2 to 4 $\mu$m of the nickel layer.

Texturing is carried out directly after the polishing, ie. without removal of the substrate from the automatic machine. For this purpose, a coarse abrasive grain which has from 3 to 10 times the particle size of the polishing agent initially used is employed, so that, after a treatment time of from 15 to 50 sec, the nickel layer has a peak-to-valley height $R_t$ of from 0.04 to 0.1 $\mu$m, an average peak-to-valley height of $R_z$ of from 0.04 to 0.1 $\mu$m and a center line average value $R_a$ of from 0.0065 to 0.0095 $\mu$m. The texture produced by the novel process has arcuate radial sections. This means that the scratches close to one another run outward from the center of the disk-shaped substrate in an arc-like manner to the circumference of the disk.

This texture is obtained by means of the automatic lapping machine. To achieve this, for example, the nickel-plated aluminum substrates are first polished by means of a fine-grained polishing agent between two polishing rings covered with conventional polishing cloths, in order to eliminate local irregularities. After removal of from 2.0 to 4.0 $\mu$m per side, the fine-grained polishing agent is replaced briefly with a polishing agent which is coarser than the first polishing agent, for subsequent texturing without interruption of the rotation process.

After this treatment, the textured substrates are cleaned with a cleaning emulsion to effect cleaning and water to remove the said emulsion, cleaning being effected in a cleaning apparatus conventionally used for the purpose, for example a brush machine having brush and spray modules in series, and the said substrates are immediately fed to the subsequent cobalt-coating procedure without additional drying. The baths used for chemical deposition of the cobalt/phosphorus-based magnetic layer are known and are described in many publications.

The particular advantages of the novel process are that the number of treatment steps required for substrate production is reduced. Consequently, it is possible to increase the yield in substrate production, to reduce the work and mechanical effort required for substrate production and substantially to improve the quality of the resulting thin-film magnetic disks.

We claim:
1. A process for the surface treatment of a disk-shaped nickel-plated aluminum substrate which is suitable as a base for the production of a metallic film disk having a magnetizable cobalt-phosphorus layer, by polishing and texturing the nickel layer to a peak-to-valley height $R_t$ from 0.04 to 1.0 $\mu$m, an average peak-to-valley height $R_z$ of from 0.04 to 0.1 $\mu$m and a center line average value $R_a$ of from 0.0065 to 0.0095 $\mu$m, wherein the nickel-plated aluminum disk is first polished with a polishing agent, in an automatic machine which laps on both sides, with removal of from 2.0 to 4.0 $\mu$m of the surface per side, to a center line average value $R_a$ of from 0.004 to 0.006 $\mu$m, and directly thereafter is textured in the same automatic machine with the use of a polishing agent which has from 3 to 10 times the particle size of that initially used, with the formation of arcuate radial sections.

* * * * *